United States Patent
Ahmed et al.

(10) Patent No.: US 12,517,534 B2
(45) Date of Patent: Jan. 6, 2026

(54) DUAL INPUT SELF-REFERENCED VOLTAGE REGULATOR

(71) Applicant: QUALCOMM Incorporated, San Diego, CA (US)

(72) Inventors: Shamim Ahmed, Mesa, AZ (US); Richard Nguyen, Burghaslach (DE)

(73) Assignee: QUALCOMM INCORPORATED, San Diego, CA (US)

( * ) Notice: Subject to any disclaimer, the term of this patent is extended or adjusted under 35 U.S.C. 154(b) by 198 days.

(21) Appl. No.: 18/514,440

(22) Filed: Nov. 20, 2023

(65) Prior Publication Data
US 2025/0165018 A1    May 22, 2025

(51) Int. Cl.
G05F 1/575    (2006.01)
G05F 1/46    (2006.01)
G05F 3/26    (2006.01)

(52) U.S. Cl.
CPC .............. G05F 1/468 (2013.01); G05F 1/575 (2013.01); G05F 3/262 (2013.01)

(58) Field of Classification Search
CPC ........... G05F 1/468; G05F 1/575; G05F 3/262
See application file for complete search history.

(56) References Cited

U.S. PATENT DOCUMENTS

| | | | |
|---|---|---|---|
| 6,989,659 B2* | 1/2006 | Menegoli | G05F 3/262 323/275 |
| 7,064,534 B2* | 6/2006 | McClure | G05F 3/247 307/64 |
| 8,013,473 B2* | 9/2011 | Frew | H02J 1/10 307/130 |
| 9,564,804 B2* | 2/2017 | Uan-Zo-Li | H02M 3/158 |
| 2008/0054721 A1 | 3/2008 | Frew et al. | |
| 2008/0084195 A1 | 4/2008 | Frew et al. | |

FOREIGN PATENT DOCUMENTS

| | | |
|---|---|---|
| EP | 3828662 A1 | 6/2021 |
| JP | 2006042402 A | 2/2006 |

OTHER PUBLICATIONS

International Search Report and Written Opinion—PCT/US2024/053057—ISA/EPO—Jan. 28, 2025.

\* cited by examiner

*Primary Examiner* — Adolf D Berhane
(74) *Attorney, Agent, or Firm* — Loza & Loza, LLP (57) ABSTRACT

An apparatus for voltage regulation is disclosed. In some implementations, the apparatus includes: a first voltage regulator configured to generate a regulated voltage at an output based on a first supply voltage on a first voltage rail; a second voltage regulator configured to generate the regulated voltage at the output based on a second supply voltage on a second voltage rail; and a control circuit configured to: maintain the first and second voltage regulators generating the regulated voltage at the same time in response to a first condition; and prevent cross-coupling of the second supply voltage to the first voltage rail in response to a second condition.

28 Claims, 4 Drawing Sheets

DUAL INPUT SELF-REFERENCED VOLTAGE REGULATOR

FIELD

Aspects of the present disclosure relate generally to voltage regulators, and in particular, to a dual input self-referenced voltage regulator.

BACKGROUND

A dual input voltage regulator may be used to generate an output regulated voltage for a set of one or more circuits. A first input of the dual input voltage regulator may receive a voltage from a battery. A second input of the dual input voltage regulator may receive a battery charger voltage. Managing the regulation of the output voltage based on the presence of one or both the battery voltage and the charger voltage is of interest.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes a first voltage regulator configured to generate a regulated voltage at an output based on a first supply voltage on a first voltage rail; a second voltage regulator configured to generate the regulated voltage at the output based on a second supply voltage on a second voltage rail; and a control circuit configured to: maintain the first and second voltage regulators generating the regulated voltage at the same time in response to a first condition; and prevent a cross-coupling of the second supply voltage to the first voltage rail in response to a second condition.

Another aspect of the disclosure relates to a method. The method includes: generating a regulated voltage at an output based on a first supply voltage on a first voltage rail based on a first condition; generating the regulated voltage based on a second supply voltage on a second voltage rail on a second condition; and decoupling the first voltage rail from the output in response to a third condition.

Another aspect of the disclosure relates to an apparatus. The apparatus includes a first voltage regulator configured to generate a regulated voltage at an output based on a first supply voltage on a first voltage rail; a second voltage regulator configured to generate the regulated voltage at the output based on a second supply voltage on a second voltage rail; and a control circuit configured to: couple the first and second voltage rails to the output at the same time in response to a first condition; and decouple the first voltage rail from the output in response to a second condition.

Another aspect of the disclosure relates to an apparatus. The apparatus includes: means for generating a regulated voltage at an output based on a first supply voltage on a first voltage rail based on a first condition; means for generating the regulated voltage based on a second supply voltage on a second voltage rail on a second condition; and means for decoupling the first voltage rail from the output in response to a third condition.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Certain integrated circuits (ICs), including system on chips (SOCs), may include some circuits that draw battery power while in off mode (e.g., while "on the shelf" for subsequent product distribution). In many cases, such circuits are implemented with relatively small process nodes, such as 22 nanometers (nm) or 40 nm. Due to the small nature of the devices in such process nodes, the circuits may not directly accept the battery voltage (e.g., 2.7-4.8 Volts (V)) because it would exceed the reliability limits of the devices used in those circuits. Accordingly, such ICs or SOCs may include an integrated voltage regulator to step down the battery voltage to levels more suitable for such circuits (e.g., 2.45V).

Typically, the integrated voltage regulator consumes some current in performing the battery step down voltage. The integrated voltage regulator may also be a dual input voltage regulator to receive the battery voltage and a battery charger voltage when present. As exemplified in more detail further below, the integrated voltage regulator should sense the charger voltage quickly (especially when it's unplugged) so that it can switch to the battery voltage from the charger voltage, while preventing the output regulated voltage for the circuits from dropping too low. If it drops too low, the circuits may malfunction or may be damaged. Thus, the integrated voltage regulator is typically implemented with a fast control circuit to perform the switching between the battery voltage and charger voltage. And, as such, the integrated voltage regulator may consume significant current (e.g., 1.6 micro Amperes (μA)).

Figure 1:
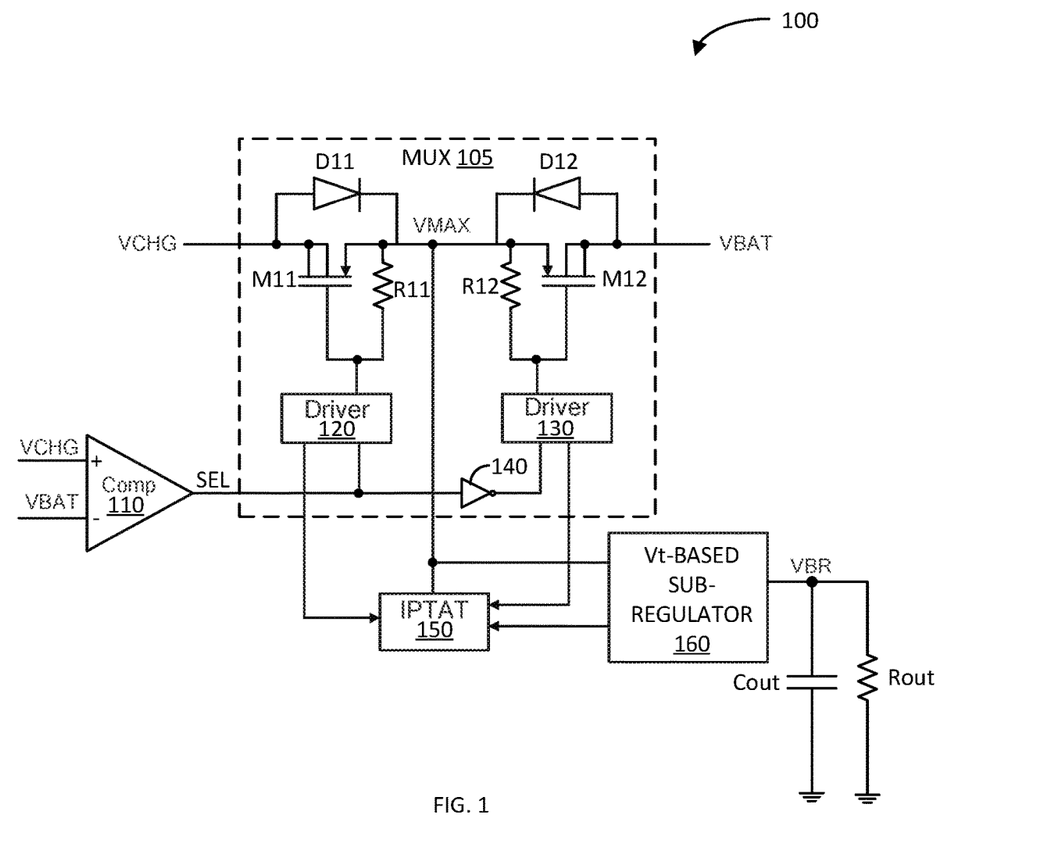
FIG. 1 illustrates a schematic/block diagram of an example dual input voltage regulator in accordance with an aspect of the disclosure.

FIG. 1 illustrates a schematic/block diagram of an example dual input voltage regulator 100 in accordance with an aspect of the disclosure. The voltage regulator 100 includes a first input configured to receive a battery charger voltage VCHG, and a second input configured to receive a battery voltage VBAT. The voltage regulator 100 includes a multiplexer 105 including a first switching device M11 (e.g., a p-channel field effect transistor (FET)), a first diode D11, a first resistive device (e.g., resistor) R11, and a first driver 120. Additionally, the multiplexer 105 includes a second switching device M12 (e.g., a p-channel FET), a second diode D12, a second resistive device (e.g., resistor) R12, and a second driver 130.

The first switching device M11 (e.g., drain and source) and the first diode D11 (e.g., in the forward direction or pn-junction, respectively) are coupled between the charger voltage VCHG input and an output (VMAX) of the multiplexer 105. Similarly, the second switching device M12 (e.g., source and drain) and the second diode D12 (e.g., in the forward direction or pn-junction, respectively) are coupled between the battery voltage VBAT input and the output of the multiplexer 105. Along a first current path, the first resistor R11 is coupled in series with the first driver 120 between the source of the first switching device M11 and a current sink 150 (e.g., a proportional to absolute temperature (PTAT) current sink). Similarly, along a second current path, the second resistor R12 is coupled in series with the second driver 130 between the source of the second switching device M12 and the current sink 150.

The voltage regulator 100 further includes a comparator 110 including a first (e.g., positive) input configured to receive the charger voltage VCHG and a second (e.g., negative) input configured to receive the battery voltage VBAT. The comparator 110 includes an output coupled to the first driver 120, and to the second driver 130 via an inverter 140. The multiplexer 105 is configured to select either the charger voltage VCHG or the battery voltage VBAT as the output voltage VMAX of the multiplexer 105 based on a comparison performed by the comparator 110.

For example, if the charger voltage VCHG is greater than the battery voltage VBAT, the comparator 110 outputs an asserted select (SEL) control signal (e.g., a logic one (1)), and the inverter 140 generates a deasserted select (SEL) control signal (e.g., a logic zero (0)). The asserted SEL signal activates the first driver 120 to draw current from the source of the first switching device M11 via the first resistor R11 to lower the gate voltage of the first switching device M11; and thereby, turn on the first switching device M11. This causes the multiplexer 105 to output the charger voltage VCHG as VMAX. The deasserted SEL signal does not activate the second driver 130, and thus, the second switching device M12 is off.

Conversely, if the charger voltage VCHG is less than the battery voltage VBAT, the comparator 110 outputs a deasserted select (SEL) control signal (e.g., a logic zero (0)), and the inverter 140 generates an asserted select (SEL) control signal (e.g., a logic one (1)). The asserted SEL signal activates the second driver 130 to draw current from the source of the second switching device M12 via the second resistor R11 to lower the gate voltage of the second switching device M12; and thereby, turn on the second switching device M12. This causes the multiplexer 105 to output the charger voltage VBAT as VMAX. The deasserted SEL signal does not activate the first driver 120, and thus, the first switching device M11 is off.

The mux output voltage VMAX is provided to the current sink 150 for operation, and to a threshold voltage Vt-based sub-regulator 160. The Vt-based sub-regulator 160 generates a regulated voltage VBR based on the mux output voltage VMAX. The regulated voltage VBR may be provided to one or more circuits of, for example, an IC or SOC, which is represented herein as a capacitive load Cout and a resistive load Rout. As previously discussed, such circuits may operate during off mode or shelf life; and thus, battery current consumption of the voltage regulator should be kept low to extend product shelf life.

However, when the charger is disconnected from the voltage regulator 100 (e.g., the charger voltage VCHG was present and then was unplugged), it is desirable for the voltage regulator 100 to respond quickly; otherwise, the mux output voltage VMAX may drop to a level where the Vt-based sub-regulator 160 may not be able to properly generate the regulated voltage VBR. Thus, the comparator 110, drivers 120 and 130, and current sink 150 are implemented to draw significant current to achieve the quick time required to prevent the mux output voltage VMAX from dropping too low. As discussed, such significant current may reduce product shelf life, which is typically undesirable. Just as a side note, the first and second diodes D11 and D12 are for startup purposes to produce an initial voltage VMAX based on diode voltage drops from the charger voltage VCHG and battery voltage VBAT, respectively.

Figure 2:
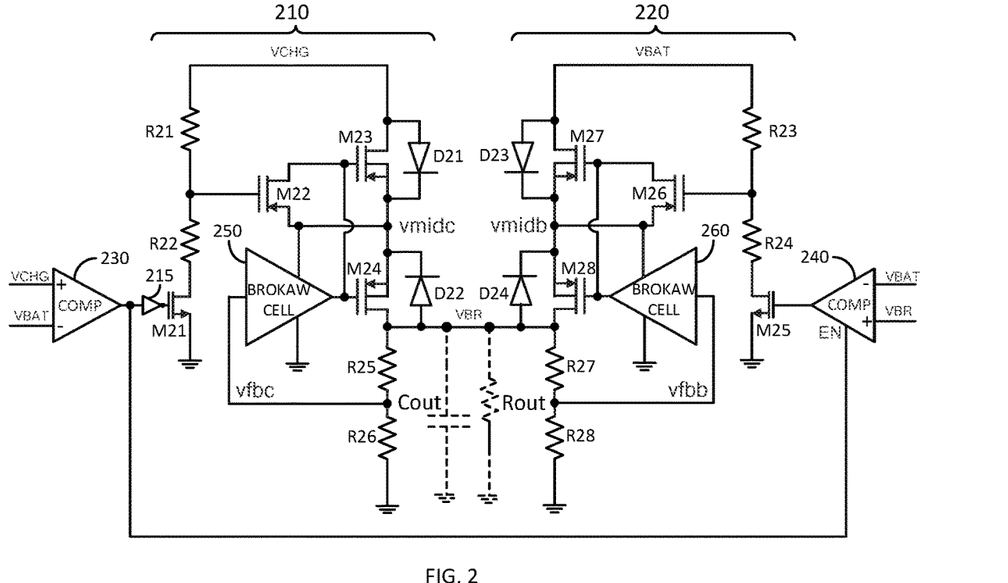
FIG. 2 illustrates a schematic/block diagram of an example dual input self-referenced voltage regulator in accordance with an aspect of the disclosure.

FIG. 2 illustrates a schematic/block diagram of an example dual input self-referenced voltage regulator 200 in accordance with an aspect of the disclosure. As discussed in more detail, the voltage regulator 200 includes two voltage regulators associated with the charger and the battery that are activated or operational for voltage regulation purposes at the same time based on certain conditions. For example, the two voltage regulators are activated at the same time when the charger voltage VCHG is greater than the battery voltage VBAT (and the battery voltage VBAT is greater than the regulated voltage VBR, e.g., not a depleted battery scenario). In such case, if the charger is removed, the battery voltage regulator continues to generate the regulated voltage VBR, which avoids a drop in the regulated voltage VBR as may be the case for voltage regulator 100.

In response to the charger being removed from the voltage regulator 200, the charger voltage regulator decouples its voltage rail from the output of the voltage regulator 200 to prevent cross-coupling of the battery voltage VBAT to the charger voltage rail. Additionally, if the charger voltage VCHG is present, and the battery is depleted such that the battery voltage VBAT is less than the regulated voltage VBR, the battery voltage regulator decouples its voltage rail from the output of the voltage regulator 200 to prevent cross-coupling of the charger voltage VCHG to the battery voltage rail.

In particular, the voltage regulator 200 includes a charger voltage regulator 210, a battery voltage regulator 220, and a control circuit including a first comparator 230 and a second comparator 240.

The charger voltage regulator 210 includes a first resistive device R21 (e.g., a resistive device may be a resistor or other type of resistive device), a second resistive device R22, and a FET M21 (e.g., n-channel FET) coupled in series between a charger voltage rail VCHG and a lower voltage rail (e.g., ground). The charger voltage regulator 210 further includes an inverter 215 including an input coupled to an output of the first comparator 230 and an output coupled to a gate of the FET M21. The charger voltage regulator 210 further includes FETs M23 and M24 (e.g., p-channel FETs) and resistive devices R25 and R26 coupled in series between the charger voltage rail VCHG and the lower voltage rail. Additionally, the charger voltage regulator 210 includes first and second diodes D21 and D22 coupled in parallel with the drain/source and source/drain of the FETs M23 and M24 in forward and reverse bias directions, respectively.

The charger voltage regulator 210 additionally includes a FET M22 (e.g., a p-channel FET) including a gate coupled to a node between the resistive devices R21 and R22, a drain coupled to the gates of FETs M23 and M24, and a source coupled to the sources of FETs M23 and M24, respectively. Further, the charger voltage regulator 210 includes a Brokaw cell 250 including an input coupled to a node between the resistive devices R25 and R26, and an output coupled to gates of the FETs M23 and M24, respectively. The Brokaw cell 250 is coupled between the sources of FET M23 and M24 to receive a bias voltage vmidc therefrom, and the lower voltage rail.

The battery voltage regulator 220 is structured similarly to the charger voltage regulator 210. The battery voltage regulator 220 includes a first resistive device R23, a second resistive device R22, and a FET M25 (e.g., n-channel FET) coupled in series between a battery voltage rail VBAT and the lower voltage rail. The FET M25 includes a gate coupled to an output of the second comparator 240. The battery voltage regulator 220 further includes FETs M27 and M28 (e.g., p-channel FETs) and resistive devices R27 and R28 coupled in series between the battery voltage rail VBAT and the lower voltage rail. Additionally, the battery voltage regulator 220 includes first and second diodes D23 and D24 coupled in parallel with the drain/source and source/drain of the FETs M27 and M28 in forward and reverse bias directions, respectively.

The battery voltage regulator 220 additionally includes a FET M26 (e.g., a p-channel FET) including a gate coupled to a node between resistive devices R23 and R24, a drain coupled to the gates of FETs M27 and M28, and a source coupled to the sources of FETs M27 and M28, respectively. Further, the battery voltage regulator 220 includes a Brokaw cell 260 including an input coupled to a node between the resistive devices R27 and R28, and an output coupled to gates of the FETs M27 and M28, respectively. The Brokaw cell 260 is coupled between the sources of FET M27 and M28 to receive a bias voltage vmidb therefrom, and the lower voltage rail.

The voltage regulator 200 includes an output coupled to the nodes between the FETs M24 and M28 and resistive devices R25 and R27, respectively. A load (e.g., one or more circuits), as represented by a capacitive load Cout and a resistive load Rout, is coupled between the output of the voltage regulator 200 and the lower voltage rail.

The first comparator 230 includes a first (e.g., positive) input configured to receive the charger voltage VCHG, and a second (e.g., negative) input configured to receive the battery voltage VBAT. Note, for ease of explanation, the voltage rail and the corresponding voltage are referred to by the same term. As mentioned, the output of the first comparator 230 is coupled to the input of the inverter 215, and an enable (EN) input of the second comparator 240. The second comparator 240, in turn, includes a first (e.g., negative) input configured to receive the battery voltage VBAT and a second (e.g., positive) input configured to receive the regulated voltage VBR at the output of the voltage regulator 200. As mentioned, the output of the second comparator 240 is coupled to the gate of FET M25.

In operation, in the case of a first condition where that the charger voltage VCHG is greater than the battery voltage VBAT, and the battery voltage VBAT is greater than the output regulated voltage VBR, both the charger and battery voltage regulators 210 and 220 are active or operational for voltage regulation purposes. That is, both Brokaw cells 250 and 260 are performing voltage regulation operations based on feedback voltages vfbc and vfbb at nodes between resistive devices R25/R26 and R27/R28 to control the FETs M23/M24 and M27/M28 to generate the regulated voltage VBR at the output of the voltage regulator 200, respectively. The reason being is that the first comparator 230 via the inverter 215 generates a logic low voltage at the gate of FET M21; thereby keeping FET M21 turned off. This results in FETs M23 and M24 being turned on, as discussed further herein. Similarly, the second comparator 240, which is enabled by the logic high voltage generated by the first comparator 230, generates a logic low voltage at the gate of FET M25; thereby keeping FET M25 turned off. This results in FETs M27 and M28 being turned on, as discussed further herein.

More specifically, with regard to the charger voltage regulator 210, when the charger voltage VCHG is greater than the battery voltage VBAT, the first comparator 230 generates a high logic voltage. The inverter 215 inverts the high logic voltage and applies a low logic voltage to the gate of FET M21 to turn off FET M21. As FET M21 is turned off, substantially no current is flowing from the charger voltage rail VCHG to the lower voltage rail via the resistive devices R21 and R22. Accordingly, the gate of FET M22 is at substantially the charger voltage potential, which turns off the FET M22. Thus, the FET M22, which is coupled across the source-gate of the FETs M23 and M24, does not turn off the FETs M23 and M24. And thus, the Brokaw cell 250 is able to perform the regulation of the output voltage VBR by controlling the FETs M23 and M24 based on the feedback voltage vfbc taken off the node between resistive devices R25 and R26 proceeds.

Similarly, with regard to the battery voltage regulator 230, when the battery voltage VBAT is greater than the regulated voltage VBR, the second comparator 240 generates a low logic voltage. The low logic voltage is applied to the gate of FET M25 to turn off FET M25. As FET M25 is turned off, substantially no current is flowing from the battery voltage rail VBAT to the lower voltage rail via the resistive devices R23 and R24. Accordingly, the gate of FET M26 is at substantially the battery voltage potential, which turns off the FET M26. Thus, the FET M26, which is coupled across the source-gate of the FETs M27 and M28, does not turn off the FETs M27 and M28. And thus, the Brokaw cell 260 is able to perform the regulation of the output voltage VBR by controlling the FETs M27 and M28 based on the feedback voltage vfbb taken off the node between resistive devices R27 and R28 proceeds.

In the case of a second condition where that the charger voltage VCHG is greater than the battery voltage VBAT, and the battery voltage VBAT is less than the output regulated voltage VBR (e.g., a depleted battery condition), the charger voltage regulator 210 remains active or operational for voltage regulation purposes as previously discussed, while the battery voltage regulator 220 is disabled, and prevents the cross-coupling of the charger voltage VCHG to the battery voltage rail VBAT. In such case, the second comparator 240 generates a high logic voltage to turn on FET M25. Thus, a current path is formed from the battery voltage rail VBAT to the lower voltage rail via the resistive devices R23 and R24 and FET M25. This causes the voltage at the gate of FET M26 to decrease; and thereby, turn on FET M26. The turned-on FET M26 shorts the source-gate of the FETs M27 and M28; thereby, turning off FETs M27 and M28. Thus, this prevents cross-coupling of the charger voltage VCHG to the battery voltage rail VBAT via the output.

In the case of a third condition where the charger voltage VCHG is less than the battery voltage VBAT, the first comparator 230 outputs a logic low voltage. The logic low voltage, provided to the enable input of the second comparator 240 disables the second comparator 240; and thereby, FET M25 remains off. In such case, as discussed above, the battery voltage regulator 220 is activated or operational for voltage regulation purposes. With regard to the charger voltage regulator 210, the inverter 215 inverts the logic low voltage to generate a logic high voltage to turn on FET M21. Thus, a current path is formed from the charger voltage rail VCHG to the lower voltage rail via resistive devices R21 and R22 and FET M21. This causes the voltage at the gate of FET M22 to decrease; and thereby, turn on FET M22. The turned-on FET M22 shorts the source-gate of the FETs M23 and M24; thereby, turning off FETs M23 and M24. Thus, this prevents cross-coupling of the battery voltage VBAT to the charger voltage rail VCHG via the output.

The resistive devices R25, R26, R27, and R28 may be set to resistances such that the feedback voltage vfbc provided to the input of the Brokaw cell 250 is greater than the feedback voltage vfbb provided to the input of the Brokaw cell 260 when both the charger and battery voltage regulators 210 and 220 are active or operational. The higher feedback voltage vfbc causes the Brokaw cell 250 to drive the FETs M23 and M24 stronger compared to the Brokaw cell 260. This may be done so that the output regulated voltage is based more on the current from the charger than from the battery in order to conserve battery life.

As an additional side note, the diodes D21 and D23 provide the bias voltages vmidc and vmidb to the Brokaw cells 250 and 260 when the charger voltage VCHG and the battery voltage VBAT are both present, respectively during the start-up of the regulator. The diode D22 provides the bias voltage vmidc for the Brokaw cell 250 from the output when the charger voltage regulator 210 is disabled, and the battery voltage regulator 220 is enabled. Similarly, the D24 provides the bias voltage vmidb to the Brokaw cell 260 from the output when the battery voltage regulator 260 is disabled, and the charger voltage regulator 210 is enabled.

Figure 3:
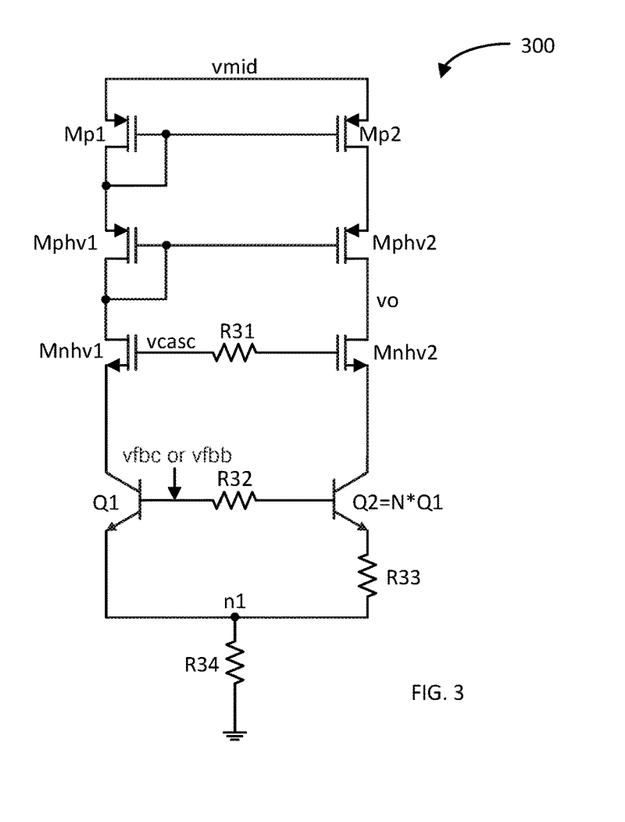
FIG. 3 illustrates a schematic/block diagram of an example Brokaw cell in accordance with another aspect of the disclosure.

FIG. 3 illustrates a schematic/block diagram of an example Brokaw cell 300 in accordance with another aspect of the disclosure. The Brokaw cell 300 may be an example implementation of any of the Brokaw cells 250 and 260 of voltage regulator 200. In particular, the Brokaw cell 300 includes a first FET Mp1 (e.g., a p-channel FET), a second FET Mphv1 (e.g., a p-channel FET), a third FET Mnhv1 (e.g., an n-channel FET), and a first bipolar junction transistor (BJT) Q1 coupled in series via their source/drain-drain/source and collector-emitter between a vmid node (e.g., node where the bias voltage vmidc or vmidb are generated, as previously discussed) and node n1.

The Brokaw cell 300 includes a fourth FET Mp2 (e.g., a p-channel FET), a fifth FET Mphv2 (e.g., a p-channel FET), a sixth FET Mnhv2 (e.g., an n-channel FET), and a second BJT Q2 are coupled in series via their source/drain-drain/source and collector-emitter, and including resistive device (e.g., resistor) R33 between the vmid node and node n1. The Brokaw cell 300 further includes another resistive device R34 coupled between node n1 and a lower voltage rail (e.g., ground).

The gates of the FETs Mp1 and Mp2 are coupled together and to the drain of FET Mp1 to form a current mirror to produce essentially the same current in each current leg or path. The gates of the FETs Mphv1 and Mphv2 (e.g., higher reliability voltage compared to Mp1/Mp2 to protect the BJTs Q1 and Q2) are coupled together and to the drain of FET Mphv1. The gates of the FETs Mnhv1 and Mnhv2 (e.g., also higher reliability voltage compared to Mp1/Mp2) are coupled together via a resistive device R31, and are provided to improve the matching between the collectors of the BJTs Q1 and Q2 via a cascode voltage vcasc generated at the gate of FET Mnhv1. The bases of the BJTs Q1 and Q1 are coupled together via a resistive device R32. The size of BJT Q2 may be greater than the size of BJT Q1 by, for example, a factor of N (e.g., 14 or other depending on application). The feedback voltage vfb (e.g., vfbc or vfbb of voltage regulator 200) may be provided to the base of BJT Q1. The output of the Brokaw cell 300 is situated at a node between the drains of FETs Mphv2 and Mnhv2 and is connected to the gates of M24/M23 for the VCHG side regulator 210 and to the gates of M28/M27 for the VBAT side regulator 220.

Figure 4:
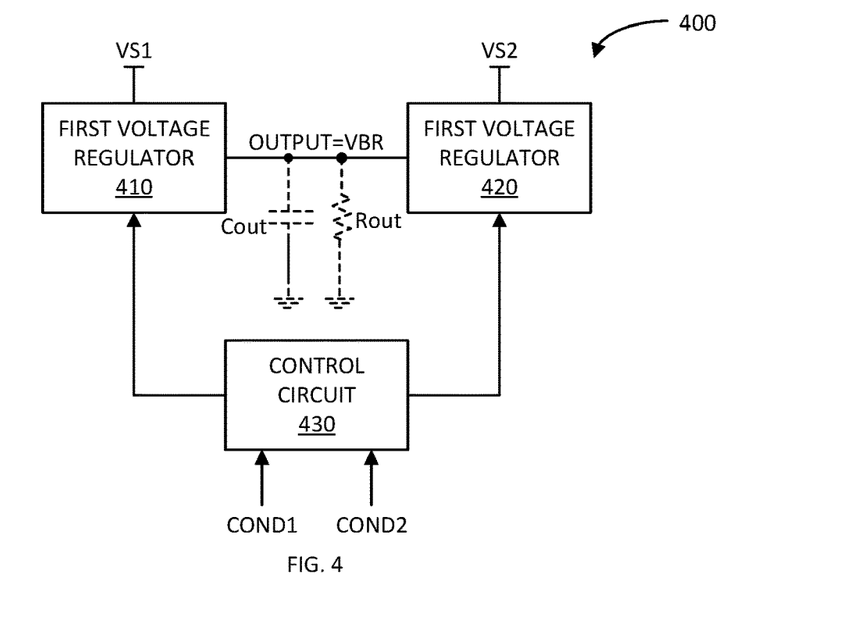
FIG. 4 illustrates a schematic/block diagram of another example dual input self-referenced voltage regulator in accordance with an aspect of the disclosure.

FIG. 4 illustrates a schematic/block diagram of another example dual input self-referenced voltage regulator 400 in accordance with an aspect of the disclosure. The voltage regulator 400 includes a first voltage regulator 410 configured to generate a regulated voltage VBR at an output (which may be coupled to a load (represented as a capacitive load Cout and a resistive load Rout), such as one or more circuits of an IC or SOC) based on a first supply voltage on a first voltage rail VS1. The voltage regulator 400 further includes a second voltage regulator 420 configured to generate the regulated voltage VBR at the output based on a second supply voltage on a second voltage rail VS2.

Additionally, the voltage regulator 400 includes a control circuit 430 configured to maintain the first and second voltage regulators generating the regulated voltage at the same time in response to a first condition (COND1) (e.g., VS1>VS2) received at a first input; and prevent cross-coupling of the second supply voltage to the first voltage rail in response to a second condition (COND2) (e.g., VS2>VS1) received at a second input.

Figure 5:
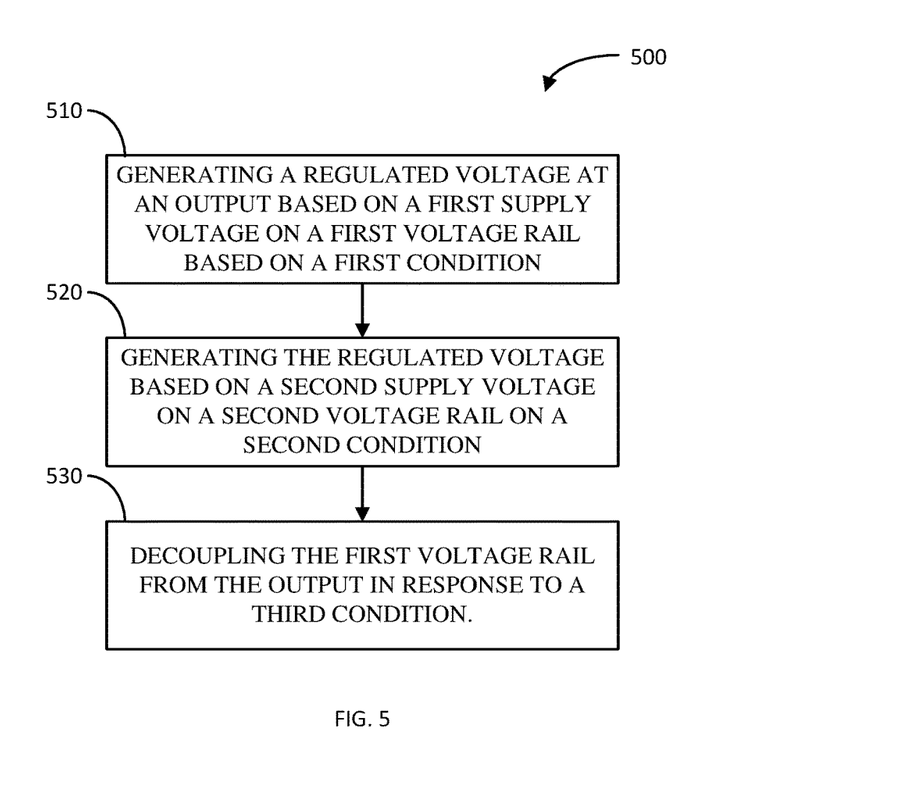
FIG. 5 illustrates a flow diagram of an example method of generating a regulated voltage in accordance with another aspect of the disclosure.
Figure 6:
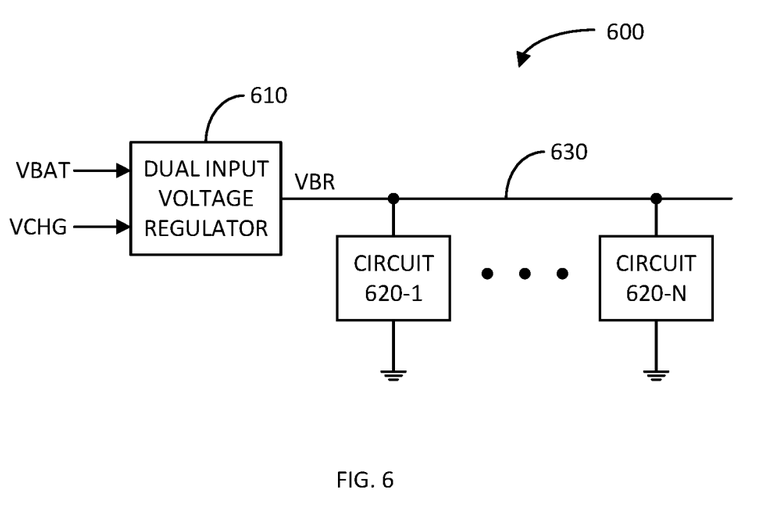
FIG. 6 illustrates a block diagram of an example integrated circuit (IC) or system on chip (SOC) in accordance with another aspect of the disclosure.

FIG. 5 illustrates a flow diagram of an example method 500 of generating a regulated voltage in accordance with another aspect of the disclosure. The method 500 includes generating a regulated voltage at an output based on a first supply voltage on a first voltage rail based on a first condition (block 510). Examples of means for generating a regulated voltage at an output based on a first supply voltage on a first voltage rail based on a first condition include the first voltage regulator 410; and more specifically, the Brokaw cell 250, FETs M23 and M24, and resistive devices R21 and R22.

The method 500 further includes generating the regulated voltage based on a second supply voltage on a second voltage rail on a second condition (block 520). Examples of means for generating the regulated voltage based on a second supply voltage on a second voltage rail on a second condition include the second voltage regulator 420; and more specifically, the Brokaw cell 260, FETs M27 and M28, and resistive devices R25 and R26.

Further, the method 500 includes decoupling the first voltage rail from the output in response to a third condition (block 530). Examples of means for decoupling the first voltage rail from the output in response to a third condition include the first voltage regulator 410, and more specifically, the FET M23.

The following provides an overview of aspects of the present disclosure:

Aspect 1: An apparatus, comprising: a first voltage regulator configured to generate a regulated voltage at an output based on a first supply voltage on a first voltage rail; a second voltage regulator configured to generate the regulated voltage at the output based on a second supply voltage on a second voltage rail; and a control circuit configured to: maintain the first and second voltage regulators generating the regulated voltage at the same time in response to a first condition; and prevent cross-coupling of the second supply voltage to the first voltage rail in response to a second condition.

Aspect 2: The apparatus of aspect 1, wherein the first condition comprises the first supply voltage being greater than the second supply voltage.

Aspect 3: The apparatus of aspect 1 or 2, wherein the second condition comprises the first supply voltage being less than the second supply voltage.

Aspect 4: The apparatus of any one of aspects 1-3, wherein the control circuit comprises a first comparator configured to generate a first control signal based on the first and second supply voltages, wherein the first voltage regulator comprises a field effect transistor (FET) coupled between the first voltage rail and the output, wherein the FET is configured to turn off based on the first control signal.

Aspect 5: The apparatus of aspect 4, wherein the FET is configured to generate the regulated voltage in response to the first control signal indicating that the first supply voltage is greater than the second supply voltage.

Aspect 6: The apparatus of aspect 4 or 5, wherein the FET is configured to turn off in response to the first control signal indicating that the first supply voltage is less than the second supply voltage.

Aspect 7: The apparatus of any one of aspects 1-6, wherein the control circuit is further configured to prevent a cross-coupling of the first supply voltage to the second voltage rail in response to a third condition.

Aspect 8: The apparatus of aspect 7, wherein the third condition comprises the second supply voltage being less than the regulated voltage.

Aspect 9: The apparatus of aspect 8, wherein the third condition comprises the second supply voltage being greater than the first supply voltage.

Aspect 10: The apparatus of aspect 9, wherein the control circuit comprises: a first comparator configured to generate a first control signal based on the first and second supply voltages; and a second comparator configured to generate a second control signal based on the second supply voltage and the regulated voltage, wherein the second comparator is configured to be enabled based on the first control signal.

Aspect 11: The apparatus of aspect 10, wherein the second comparator is configured to be enabled in response to the first control signal indicating that the first supply voltage is greater than the second supply voltage.

Aspect 12: The apparatus of aspect 11, wherein the second voltage regulator comprises a field effect transistor (FET) coupled between the second voltage rail and the output, wherein the FET is configured to turn off based on the second control signal.

Aspect 13: The apparatus of aspect 12, wherein the FET is configured to turn off in response to the second control signal indicating that the second supply voltage is less than the regulated voltage.

Aspect 14: The apparatus of any one of aspects 1-13, wherein the first voltage regulator comprises: a first field effect transistor (FET), a second FET, a first resistive device, and a second resistive device coupled in series between the first voltage rail and a third voltage rail, wherein a first node between the second FET and the first resistive device is coupled to the output; and a first Brokaw cell including an input coupled to a second node between the first and second resistive devices and an output coupled to gates of the first and second FETs, respectively.

Aspect 15: The apparatus of aspect 14, wherein the second voltage regulator comprises: a third FET, a fourth FET, a third resistive device, and a fourth resistive device coupled in series between the second voltage rail and the third voltage rail, wherein a third node between the fourth FET and the third resistive device is coupled to the output; and a second Brokaw cell including an input coupled to a fourth node between the third and fourth resistive devices and an output coupled to gates of the third and fourth FETs, respectively.

Aspect 16: The apparatus of aspect 15, wherein the first, second, third, and fourth resistive devices are configured to provide a first feedback voltage to the input of the first Brokaw cell greater than a second feedback voltage provided to the input of the second Brokaw cell.

Aspect 17: The apparatus of any one of aspects 1-16, wherein at least one of the first or second voltage regulator comprises a Brokaw cell.

Aspect 18: The apparatus of aspect 17, wherein the Brokaw cell comprises: a first field effect transistor (FET), a second FET, a third FET, and a first bipolar junction transistor (BJT) coupled between a first node and a second node; a fourth FET, a fifth FET, a sixth FET, and a second BJT, and a first resistive device coupled between the first node and the second node; a second resistive device coupled between the second node and a third voltage rail; a third resistive device coupled between gates of the third and sixth FETs, respectively; and a fourth resistive device coupled between bases of the first and second BJTs, respectively; wherein gates of the first and third FETs are coupled together, and gates of the second and fourth FETs are coupled together.

Aspect 19: The apparatus of aspect 18, wherein the first, second, fourth, and fifth FETs are p-channel FETs, and wherein the third and sixth FETs are n-channel FETs.

Aspect 20: The apparatus of aspect 18 or 19, wherein a size of the second BJT is greater than a size of the first BJT.

Aspect 21: A method, comprising: generating a regulated voltage at an output based on a first supply voltage on a first voltage rail based on a first condition; generating the regulated voltage based on a second supply voltage on a second voltage rail on a second condition; and decoupling the first voltage rail from the output in response to a third condition.

Aspect 22: The method of aspect 21, wherein the first condition comprises the first supply voltage being greater than the second supply voltage.

Aspect 23: The method of aspect 21 or 22, wherein the second condition comprises the first supply voltage being greater than the second supply voltage and the second supply voltage being greater than the regulated voltage.

Aspect 24: The method of any one of aspects 21-23, wherein the third condition comprises the first supply voltage being less than the second supply voltage.

Aspect 25: The method of any one of aspects 21-24, further comprising decoupling the second voltage rail from the output in response to a fourth condition.

Aspect 26: The method of aspect 25, wherein the fourth condition comprises the second supply voltage being greater than the first supply voltage.

Aspect 27: An apparatus, comprising: a first voltage regulator configured to generate a regulated voltage at an output based on a first supply voltage on a first voltage rail; a second voltage regulator configured to generate the regulated voltage at the output based on a second supply voltage on a second voltage rail; and a control circuit configured to: couple the first and second voltage rails to the output at the same time in response to a first condition; and decouple the first voltage rail from the output in response to a second condition.

Aspect 28: The apparatus of aspect 27, wherein the first condition comprises the first supply voltage being greater than the second supply voltage.

Aspect 29: The apparatus of aspect 27 or 28, wherein the second condition comprises the first supply voltage being less than the second supply voltage.

Aspect 30: An apparatus, comprising: means for generating a regulated voltage at an output based on a first supply voltage on a first voltage rail based on a first condition; means for generating the regulated voltage based on a second supply voltage on a second voltage rail on a second condition; and means for decoupling the first voltage rail from the output in response to a third condition.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
   a first voltage regulator configured to generate a regulated voltage at an output based on a first supply voltage on a first voltage rail, wherein the first voltage regulator comprises
      a first field effect transistor (FET), a second FET, a first resistive device, and a second resistive device coupled in series between the first voltage rail and a third voltage rail, wherein a first node between the second FET and the first resistive device is coupled to the output, and
      a first Brokaw cell including an input coupled to a second node between the first and second resistive devices and an output coupled to gates of the first and second FETs, respectively;
   a second voltage regulator configured to generate the regulated voltage at the output based on a second supply voltage on a second voltage rail; and
   a control circuit configured to:
      maintain the first and second voltage regulators generating the regulated voltage at the same time in response to a first condition; and
      prevent a cross-coupling of the second supply voltage to the first voltage rail in response to a second condition.

2. The apparatus of claim 1, wherein the first condition comprises the first supply voltage being greater than the second supply voltage.

3. The apparatus of claim 1, wherein the second condition comprises the first supply voltage being less than the second supply voltage.

4. The apparatus of claim 1, wherein the control circuit comprises a first comparator configured to generate a first control signal based on the first and second supply voltages, wherein the first voltage regulator comprises a field effect transistor (FET) coupled between the first voltage rail and the output, wherein the FET is configured to turn off based on the first control signal.

5. The apparatus of claim 4, wherein the FET is configured to generate the regulated voltage in response to the first control signal indicating that the first supply voltage is greater than the second supply voltage.

6. The apparatus of claim 4, wherein the FET is configured to turn off in response to the first control signal indicating that the first supply voltage is less than the second supply voltage.

7. The apparatus of claim 1, wherein the control circuit is further configured to prevent a cross-coupling of the first supply voltage to the second voltage rail in response to a third condition.

8. The apparatus of claim 7, wherein the third condition comprises the second supply voltage being less than the regulated voltage.

9. The apparatus of claim 8, wherein the third condition comprises the second supply voltage being greater than the first supply voltage.

10. The apparatus of claim 9, wherein the control circuit comprises:
   a first comparator configured to generate a first control signal based on the first and second supply voltages; and
   a second comparator configured to generate a second control signal based on the second supply voltage and the regulated voltage, wherein the second comparator is configured to be enabled based on the first control signal.

11. The apparatus of claim 10, wherein the second comparator is configured to be enabled in response to the first control signal indicating that the first supply voltage is greater than the second supply voltage.

12. The apparatus of claim 11, wherein the second voltage regulator comprises a field effect transistor (FET) coupled between the second voltage rail and the output, wherein the FET is configured to turn off based on the second control signal.

13. The apparatus of claim 12, wherein the FET is configured to turn off in response to the second control signal indicating that the second supply voltage is less than the regulated voltage.

14. The apparatus of claim 1, wherein the second voltage regulator comprises:
   a third FET, a fourth FET, a third resistive device, and a fourth resistive device coupled in series between the second voltage rail and the third voltage rail, wherein a third node between the fourth FET and the third resistive device is coupled to the output; and
   a second Brokaw cell including an input coupled to a fourth node between the third and fourth resistive devices and an output coupled to gates of the third and fourth FETs, respectively.

15. The apparatus of claim 14, wherein the first, second, third, and fourth resistive devices are configured to provide a first feedback voltage to the input of the first Brokaw cell greater than a second feedback voltage provided to the input of the second Brokaw cell.

16. The apparatus of claim 1, wherein at least one of the first or second voltage regulator comprises a Brokaw cell.

17. The apparatus of claim 16, wherein the Brokaw cell comprises:
- a first field effect transistor (FET), a second FET, a third FET, and a first bipolar junction transistor (BJT) coupled between a first node and a second node;
- a fourth FET, a fifth FET, a sixth FET, and a second BJT, and a first resistive device coupled between the first node and the second node;
- a second resistive device coupled between the second node and a third voltage rail;
- a third resistive device coupled between gates of the third and sixth FETs, respectively; and
- a fourth resistive device coupled between bases of the first and second BJTs, respectively;
- wherein gates of the first and third FETs are coupled together, and gates of the second and fourth FETs are coupled together.

18. The apparatus of claim 17, wherein the first, second, fourth, and fifth FETs are p-channel FETs, and wherein the third and sixth FETs are n-channel FETs.

19. The apparatus of claim 17, wherein a size of the second BJT is greater than a size of the first BJT.

20. A method, comprising:
- generating a regulated voltage at an output based on a first supply voltage on a first voltage rail based on a first condition;
- generating the regulated voltage based on a second supply voltage on a second voltage rail on a second condition, wherein the second condition comprises the first supply voltage being greater than the second supply voltage and the second supply voltage being greater than the regulated voltage; and
- decoupling the first voltage rail from the output in response to a third condition.

21. The method of claim 20, wherein the first condition comprises the first supply voltage being greater than the second supply voltage.

22. The method of claim 20, wherein the third condition comprises the first supply voltage being less than the second supply voltage.

23. The method of claim 20, further comprising decoupling the second voltage rail from the output in response to a fourth condition.

24. The method of claim 23, wherein the fourth condition comprises the second supply voltage being greater than the first supply voltage.

25. An apparatus, comprising:
- a first voltage regulator configured to generate a regulated voltage at an output based on a first supply voltage on a first voltage rail;
- a second voltage regulator configured to generate the regulated voltage at the output based on a second supply voltage on a second voltage rail; and
- a control circuit configured to:
  - couple the first and second voltage rails to the output at the same time in response to a first condition; and
  - decouple the first voltage rail from the output in response to a second condition, wherein the second condition comprises the first supply voltage being greater than the second supply voltage and the second supply voltage being greater than the regulated voltage.

26. The apparatus of claim 25, wherein the first condition comprises the first supply voltage being greater than the second supply voltage.

27. The apparatus of claim 25, wherein the second condition comprises the first supply voltage being less than the second supply voltage.

28. An apparatus, comprising:
- means for generating a regulated voltage at an output based on a first supply voltage on a first voltage rail based on a first condition;
- means for generating the regulated voltage based on a second supply voltage on a second voltage rail on a second condition, wherein the second condition comprises the first supply voltage being greater than the second supply voltage and the second supply voltage being greater than the regulated voltage; and
- means for decoupling the first voltage rail from the output in response to a third condition.

* * * * *